(12) United States Patent
Taylor et al.

(10) Patent No.: US 7,959,426 B2
(45) Date of Patent: Jun. 14, 2011

(54) APPARATUS FOR PRODUCING A MULTI-LAYER PARISON HAVING A LAYER OF VARYING THICKNESS

(75) Inventors: Gregory D. Taylor, York, PA (US);
Lawrence Korpanty, York, PA (US)

(73) Assignee: Graham Packaging Company, L.P., York, PA (US)

( * ) Notice: Subject to any disclaimer, the term of this patent is extended or adjusted under 35 U.S.C. 154(b) by 606 days.

(21) Appl. No.: 11/862,555

(22) Filed: Sep. 27, 2007

(65) Prior Publication Data

US 2009/0085243 A1    Apr. 2, 2009

(51) Int. Cl.
*B29C 47/20*    (2006.01)
(52) U.S. Cl. .................. 425/133.1; 425/132; 425/145; 425/532; 425/382.4; 425/462; 425/465
(58) Field of Classification Search .................. 425/132, 425/133.1, 145, 532, 538, 381, 382.4, 462, 425/465, 466
See application file for complete search history.

(56) References Cited

U.S. PATENT DOCUMENTS

| 3,526,929 | A | * | 9/1970 | Coupland ................... 425/156 |
| 3,901,958 | A | * | 8/1975 | Doll ............................ 264/45.5 |
| 4,931,246 | A | | 6/1990 | Kudert et al. |
| 4,978,290 | A | * | 12/1990 | Fukuhara ...................... 425/147 |
| 5,840,349 | A | | 11/1998 | Brown, Jr. et al. ............ 425/532 |
| 6,129,960 | A | | 10/2000 | Kudert et al. |
| 6,194,041 | B1 | | 2/2001 | McHenry et al. |
| 6,332,767 | B1 | | 12/2001 | Kudert et al. |
| 6,471,907 | B1 | * | 10/2002 | Krall et al. .................... 264/509 |
| 7,063,222 | B2 | | 6/2006 | Sakaguchi et al. ............ 215/383 |

FOREIGN PATENT DOCUMENTS

WO    WO 2006/011565    2/2006

* cited by examiner

*Primary Examiner* — Yogendra N Gupta
*Assistant Examiner* — Joseph Leyson
(74) *Attorney, Agent, or Firm* — Stradley Ronon Stevens & Young, LLP (57) ABSTRACT

An apparatus for producing a parison having a plurality of resin layers and at least one resin layer of varying thickness is disclosed. The parison is used to form containers in a blow mold machine. An extruder is in communication with a flow head to form the parison. The apparatus includes a valve block having a duct providing communication between a second extruder and the flow head. Flow of resin from the second extruder directly to the flow head is controlled by a valve in the valve block. An accumulator cylinder and piston are also in communication with the duct and control the resin pressure within the duct. Opening and closing the valve and stroking the piston sends resin from the second extruder to the flow head and forms a resin layer having a varying thickness on the parison. A method of forming a varying layer is also disclosed.

15 Claims, 5 Drawing Sheets

APPARATUS FOR PRODUCING A MULTI-LAYER PARISON HAVING A LAYER OF VARYING THICKNESS

FIELD OF THE INVENTION

This invention relates to an apparatus and a method for producing a parison which may be used in a blow-molding operation to produce a container, the parison having at least one layer wherein the thickness of the layer varies.

BACKGROUND OF THE INVENTION

Containers holding liquids and bulk solids are economically manufactured in a continuous blow molding process wherein a parison comprising a hollow tube of molten polymer resin is extruded continuously from a flow head. The parison is acted on by a series of moving molds, each of which is formed of mold halves which sequentially engage a respective portion of the parison by closing about the parison from opposite sides. As the mold halves comprising a particular mold close about a parison portion, knives on the mold halves sever the parison portion from the continuously extruding parison. The mold then moves away from the flow head to allow the next mold to engage its respective parison portion. After a parison portion is engaged by a mold and cut from the parison, air is injected into the parison portion forcing it to expand and assume the shape of the mold. The mold is then opened to release the newly molded container to a conveyor, which transports the container for further processing. The mold then travels back to the flow head to mold the next container. A detailed description of a process and apparatus for producing the containers is provided in U.S. Pat. No. 5,840,349, hereby incorporated by reference herein.

It is advantageous to provide containers formed of multiple layers of different plastic resins having different characteristics. For example, a container holding food stuffs may have an innermost layer which is inert and will not react chemically with the container contents, an intermediate layer which is impermeable to oxygen to prevent the contents from oxidizing and an outermost layer which has a particular color, or is resistant to abrasion.

To produce such a multi-layer container, the parison from which the container is molded is extruded with multiple layers. This is accomplished in the flow head, which has multiple ports for receiving different polymer resins. The flow head has a central bore within which a mandrel is positioned, thereby forming an annular space. The different polymer resins are forced under pressure through the ports and into the annular space at different positions along the length of the flow head. In the three layer example described above, the resin that will form the innermost layer enters the annular space farthest upstream and conforms to the annular space to form a tube. This resin tube continues to flow through the flow head, and the oxygen impermeable resin enters the annular space through a port positioned further downstream. The oxygen impermeable layer is forced into the annular space and forms a second tube surrounding the aforementioned tube (the annular space is larger to accommodate the second layer). Finally, the colored resin that will form the outermost layer is introduced to the annular space through a third port downstream from the second port, and forms a third tube surrounding the first two tubes. The three layer parison thus formed exits the flow head continuously, and portions of the parison are captured by the molds in a continuous process as described above to produce the containers.

It is often desired to apply a layer which varies in thickness as a function of length along the container, or in the limiting case, a layer which extends over only a portion of the container. For example, to effect a color transition on the outermost layer so that the bottom portion of a container is one color and the top portion is another color, resin having the desired color of the container bottom portion may be injected into the annular space of the flow head to initially form a relatively thick outer resin layer which becomes gradually thinner as the parison traverses the flow head. The color of the parison will gradually change over its length, initially displaying the color of the relatively thick outer layer, and changing color gradually as the outer layer becomes thinner and the color of the underlying layer becomes visible through the thinning outer layer. The injection of a resin layer which varies in thickness produces a parison having varying characteristics, and if containers having consistent characteristics are to be produced, the injection of the varying thickness layer must be synchronized with the molds such that each mold intercepts the parison at the same position relative to the varying thickness layer. In the example provided above, this synchronization will ensure that the bottom portion of all the containers is one color, the top portion is a second color, and the transition between the top and bottom portions occurs at the same location on the container. In the extreme case, the varying layer may be an intermittent layer wherein the thickness of the varying layer drops to zero abruptly.

Prior art methods and devices for producing containers having resin layers of varying thickness have low production rates. This is due in large part to the synchronization requirements, coupled with the flow characteristics of the resin. Production rates under 40 container per minute are achieved by some prior art devices. It would be advantageous to be able to produce containers as described above at higher production rates.

SUMMARY OF THE INVENTION

The invention concerns an apparatus for producing a parison having a plurality of polymer resin layers. The apparatus is connectable in fluid communication with a flow head fed molten polymer resin by at least a first extruder. The parison is formed in the flow head and flows away therefrom. The apparatus comprises a valve block having a duct therethrough with an inlet and an outlet. The outlet is connectable in fluid communication with the flow head. A second extruder is in fluid communication with the inlet, the second extruder supplying molten polymer resin to the duct. A valve is positioned within the duct and controls the flow of the molten polymer resin directly from the second extruder to the flow head. The apparatus also includes a first melt pipe connecting the outlet to the flow head, and a second melt pipe connecting the second extruder to the inlet.

In one embodiment, the apparatus may also comprise an accumulator cylinder in fluid communication with the duct at a position between the valve and the outlet. A piston is reciprocably movable within the cylinder for controlling pressure of the molten polymer resin within the duct.

In another embodiment, the apparatus comprises a flow head and a plurality of first extruders in fluid communication with the flow head. Each of the first extruders supplies a molten polymer resin for one of the layers. The apparatus also includes a valve block having a duct therethrough. The duct has an inlet and an outlet. A second extruder supplies molten polymer resin for another one of the layers. An extruder melt pipe is connected between the second extruder and the inlet for conducting the molten polymer resin to the duct. A valve is positioned within the duct and controls flow of the molten polymer resin directly from the second extruder through the duct to the flow head. A valve actuator is operatively associated with the valve for opening and closing thereof. A flow head melt pipe is connected between the outlet and the flow head for conducting the molten polymer resin to the flow head.

The apparatus may also include an accumulator cylinder. The accumulator cylinder is in fluid communication with the duct at a position between the valve and the outlet. A piston is positioned within the accumulator cylinder, the piston being reciprocably movable within the cylinder for controlling pressure of the molten polymer resin within the duct. A piston actuator is operatively associated with the piston for effecting reciprocal motion thereof.

The apparatus may further comprise a controller operatively associated with the actuators and the extruders. The controller controls the operation of the extruders, the opening and closing of the valve and the motion of the valve piston for supplying the molten resin to the flow head.

In a particular embodiment, the flow head comprises a central conduit. A mandrel is positioned within the central conduit. A plurality of first ports are in fluid communication with the central conduit. Each of the first ports is in fluid communication with one of the first extruders. Each of the first ports permits molten resin from one of the first extruders to enter the central conduit and form one of the layers of the parison. A second port is in fluid communication with the central conduit. The second port is also in fluid communication with the flow head melt pipe and permits the molten resin from the second extruder to enter the central conduit and form a layer of the parison having a variable thickness.

The second port may be in fluid communication with the central conduit downstream of the first ports and thereby permit the molten resin from the second extruder to form an outermost layer of the parison. Alternately, the second port may be in fluid communication with the central conduit upstream of at least one of the first ports and thereby permit the molten resin from the second extruder to form an intermediate layer of the parison.

The apparatus may also include a plurality of molds. Each of the molds comprises first and second mold portions positionable on opposite sides of the parison. The mold portions are closable with one another to capture a portion of the parison within a mold space defined by the mold portions.

The invention also encompasses a method of forming a parison comprising a plurality of polymer resin layers wherein at least one of the layers has a varying thickness. The method comprises:

(a) feeding at least a first molten polymer resin to a flow head, the flow head channeling the first molten resin into a first tubular layer of the parison;

(b) feeding a second molten polymer resin directly from an extruder to the flow head, the flow head channeling the second molten polymer resin into a second tubular layer surrounding the first layer;

(c) controlling flow of the second molten polymer resin between the extruder and the flow head using a valve such that opening the valve increases the thickness of the second layer and closing the valve decreases the thickness of the second layer; and (d) drawing the parison continuously from the flow head.

The method may also include feeding the second molten polymer layer to the flow head intermittently by opening and closing the valve at predetermined intervals. The flow of the second molten polymer resin between the extruder and the flow head may further be controlled by varying the pressure of the second molten polymer resin such that increasing the pressure increases the thickness of the second layer and reducing the pressure reduces the thickness of the second layer. A third molten polymer resin may also be fed to the flow head. The flow head channels the third molten polymer resin into a third tubular layer surrounding the second layer.

DETAILED DESCRIPTION OF THE EMBODIMENTS

Figure 1:
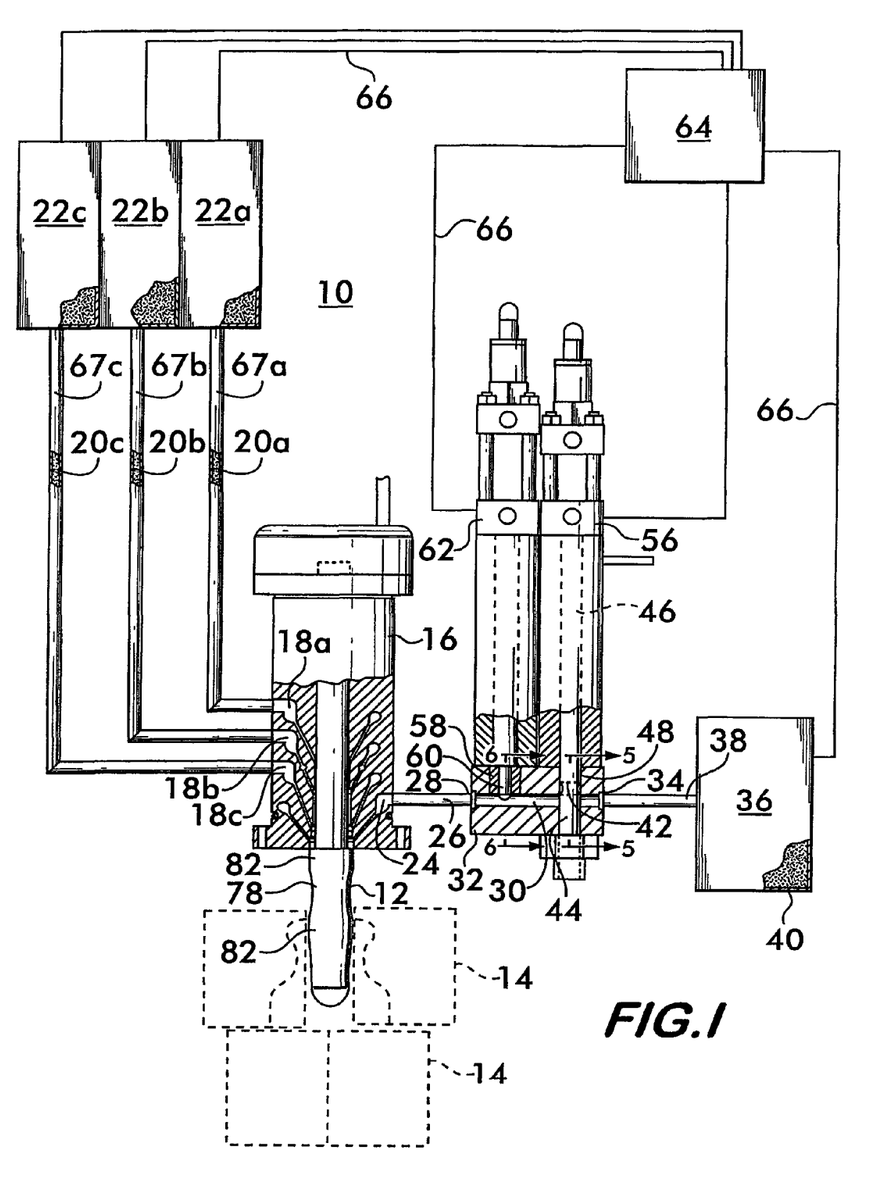
FIG. 1 is a schematic depiction of an apparatus according to the invention for producing a parison and a container from the parison.

FIG. 1 shows a schematic view of an apparatus 10 according to the invention for producing a continuous parison 12 having a plurality of layers, at least one layer of which has a varying thickness. Apparatus 10 is used in conjunction with a machine to produce containers, as represented by the molds 14, shown in phantom line.

Apparatus 10 includes a flow head 16 having one or more ports 18a, 18b, and 18c which receive molten polymer resin 20a, 20b and 20c from respective extruders 22a, 22b and 22c. These extruders feed resin to the flow head continuously to produce the continuous multi-layered parison 12 as described in detail below. The resins from each extruder may be different from one another. Three ports and three extruders are shown by way of example only, it being understood that the invention encompasses flow heads with as few as one port as well as more than three, with the appropriate number of extruders as required for the particular parison and container being produced. The extruders may be, for example, screw extruders that are commonly used for extruding molten polymer resin in the art.

Flow head 16 has a fourth port 24 which may be used to apply a resin layer having a varying thickness to the parison. In this example, port 24 is positioned downstream of ports 18a-18c so as to apply the varying thickness layer as the outermost layer of the parison, it being understood that other, upstream ports, might also be used to apply the or multiple layers of varying thickness as well. Port 24 is connected in fluid communication through a melt pipe 26 to an outlet 28 of a duct 30 within a valve block 32. Duct 30 has an inlet 34 that is in fluid communication with another extruder 36 through another melt pipe 38. Extruder 36 extrudes molten polymer resin 40 which will form the variable thickness resin layer on the parison 12 as described below. Extruder 36 may also be a screw extruder and preferably operates continuously.

Figure 5:
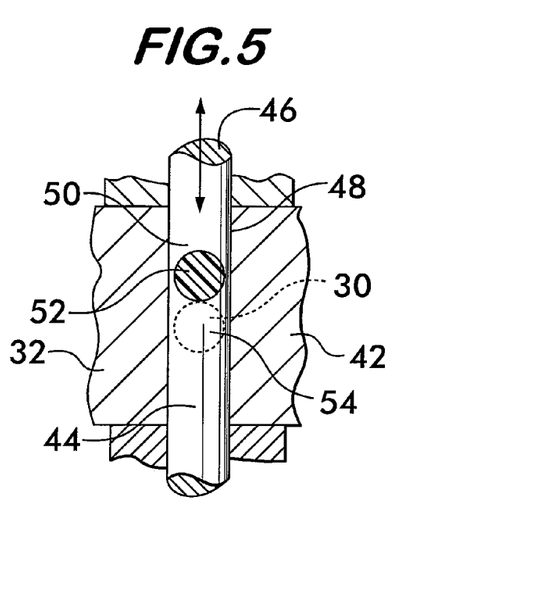
FIG. 5 is a partial sectional view taken at line 5-5 of FIG. 1.

Flow of resin 40 through the duct 30 of valve block 32 is controlled by a valve 42 positioned within the duct. Although any type of valve could be used, it is advantageous to employ a sliding gate valve comprising a valve closing member 44 which moves reciprocably within the valve block 32 transversely to the duct 30. Valve closing member 44 comprises an elongated rod 46 that slides within a bore 48 that intersects the duct 30 substantially at a right angle. As best shown in FIG. 5, rod 46 has a first portion 50 with an aperture 52 therethrough. The valve is open and permits resin 40 to flow through the duct when rod 46 is moved to position the aperture 52 (or a portion thereof) in alignment with the duct. Rod 46 has a second portion 54 adjacent to the aperture which sealingly blocks the duct 30 to close the valve and halt the flow of resin when the rod is moved to position the second portion in alignment with the duct. As shown with reference again to FIG. 1, valve 42 is actuated by a hydraulic actuator 56 which moves the rod 46 reciprocably within the bore 48. Hydraulic actuators are preferred for their speed, strength and responsiveness, although other types of actuators may also be used. Note that resin 40 flows directly from the extruder 36 to the flow head 16 through the duct 30, the flow being controlled only by valve 42. There are no intermediate accumulators or pumps into which the resin must first flow before being injected into the flow head.

Figure 6:
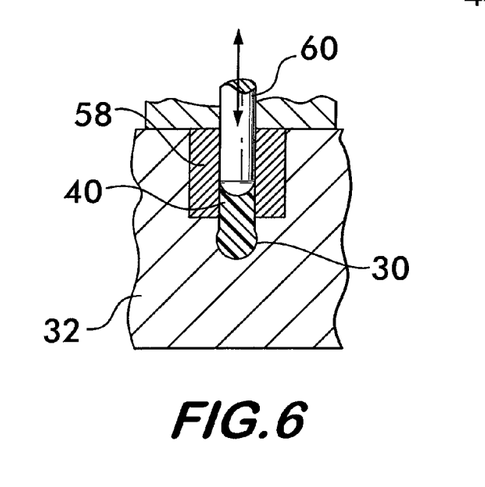
FIG. 6 is a partial sectional view taken at line 6-6 of FIG. 1.

An accumulator cylinder 58 may also be mounted on the valve block 32. Accumulator cylinder 58 is in fluid communication with the duct 30 at a position downstream of the valve 42. As shown in FIG. 6, a piston 60 is reciprocably movable within the cylinder, and together the piston and cylinder arrangement is used to augment control of resin pressure within the duct 30. Withdrawing of the piston 60 into the cylinder 58 draws resin from the duct 30 and reduces the resin pressure, while moving the piston toward the duct forces any resin in the cylinder back into the duct and increases the resin pressure therein. As shown in FIG. 1, motion of the piston 60 is preferably effected by a hydraulic actuator 62 also mounted on the valve block 32.

A controller 64 is used to control and coordinate the operation of the various components. Controller 64 may be a microprocessor with resident software, or a programmable logic controller or other electronic control means. Controller 64 is in communication with the extruders 22a-22c and 36, the actuators 56 and 62 through communication lines 66. Alternately, communication between the controller 64 and the various components could be effected through wireless devices, or a combination of wired and wireless systems. Note that the controller is also in communication with the molding machine, represented by molds 14.

Operation of the apparatus 10 is described with reference initially to FIG. 1. Extruders 22a-22c and 36 operate continuously under the command of controller 64 and extrude polymer resins 20a-20c and 40 respectively at a pressure between about 2000 psi and about 4000 psi. However, the pressure range could be significantly greater, for example, between about 800 psi to about 8000 psi depending upon the particular design of the apparatus, such as the design of the flow head and the distance over which the resin must be moved. The molten resins, for example, polyolefins, are at temperatures between about 176° C. and about 230° C. For polycarbonates it is expected that the temperature will range between about 230° C. and about 290° C. Resins 20a-20c are sent directly to the flow head 16 through respective melt pipes 67a-67c which are in fluid communication with ports 18a-18c respectively on the flow head. Resin 40 is conducted to the inlet 34 of duct 30 in valve block 32 through melt pipe 38 whereupon its further flow is controlled by valve 42. When permitted to flow through the duct 30, the resin 40 is conducted to the downstream port 24 of the flow head 16 through the melt pipe 26 which connects duct outlet 28 to the port 24.

Figure 2:
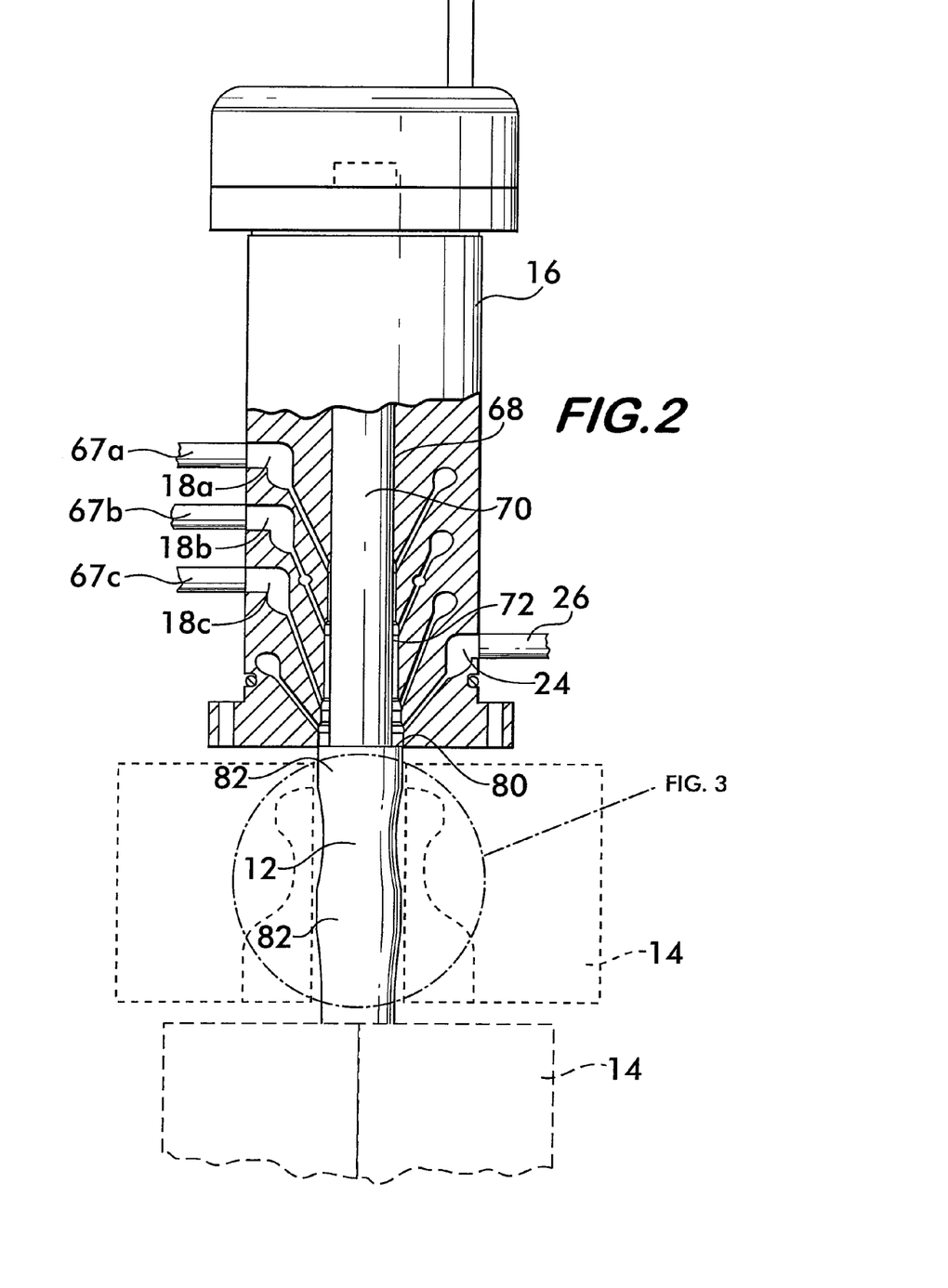
FIG. 2 is a sectional view of a portion of the apparatus shown in FIG. 1, on an enlarged scale.
Figure 3:
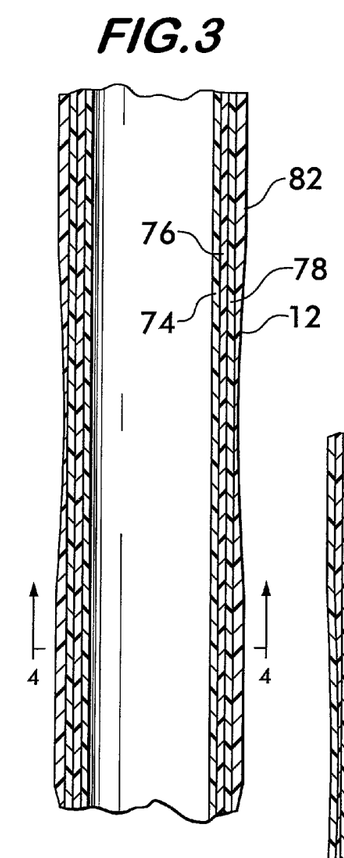
FIGS. 3, 3A and 3B are sectional views of parisons produced by the apparatus shown in FIG. 1.
Figure 4:
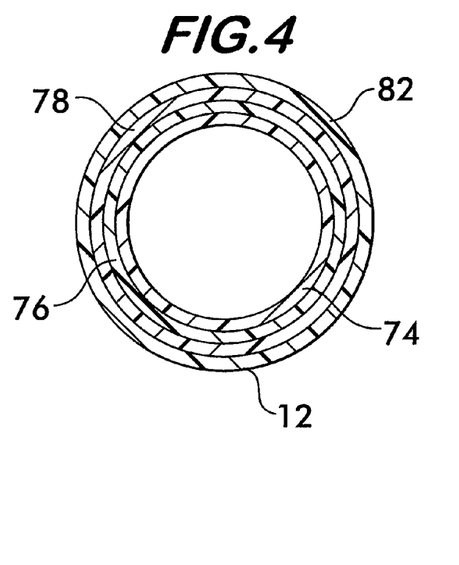
FIG. 4 is a cross sectional view taken at line 4-4 of FIG. 3.

As best shown in FIG. 2, flow head 16 has a bore 68 in which a mandrel 70 is positioned, thereby forming an annular space 72 within the flow head. The ports 18a-18c and 24 provide fluid communication from the melt pipes 67a-67c and 26 respectively through the flow head to the annular space 72. Resin 20a is forced from extruder 22a through melt pipe 67a and enters the annular space 72 through port 18a, which is the farthest upstream port. Resin 20a fills the annular space 72 and forms what will be the innermost layer 74 of the tubular parison 12 as shown in detail in FIGS. 3 and 4. Innermost layer 74 proceeds downstream in the flow head to port 18b. Resin 20b is forced from extruder 22b through melt pipe 67b and through port 18b into the annular space 72 downstream from port 18a. Resin 20b fills the annular space 72 and surrounds the innermost layer 74, thereby forming an intermediate layer 76 of the tubular parison 12 as shown in FIGS. 3 and 4. The two parison layers 74 and 76 continue to flow downstream through the flow head to port 18c. Resin 20c is forced from extruder 22c into the annular space 72 where it fills the annular space and surrounds the intermediate layer 76, forming a third layer 78 of the three layered tubular parison 12 as illustrated in FIGS. 3 and 4. Additional ports could be employed to form additional layers as desired. As shown in FIG. 2, the three layered parison 12 flows toward the port 24, and then exits the flow head at an outlet 80 where it is received by molds 14 of a blow molding machine (not illustrated).

The parison 12 exits the flow head continuously. A fourth resin layer 82 may be applied so as to have a thickness that varies with length along the parison, as described below with reference to FIGS. 1, 5 and 6. To apply resin layer 82, valve 42 is opened by sliding rod 46 within bore 48 using hydraulic actuator 56 to align the aperture 52 in the rod with the duct 30. Resin 40, provided under pressure to the duct, is released and flows through the valve 42 toward the port 24 in flow head 16. Resin pressures between about 2000 psi and about 5000 psi from the extruder 36 are feasible. Simultaneously, actuator 62 forces the piston 60 through the accumulator cylinder 58 toward the duct 30, forcing any resin 40 from the cylinder into the duct and increasing the pressure within the duct to a pressure between about 1000 psi and about 3000 psi. Resin 40 is forced through the duct and the melt pipe 26 and into port 24 where it enters the annular space 72, surrounding the third layer 78 of the parison 12 and forming an outermost resin layer 82 (see also FIGS. 3 and 4).

Figure 3A:
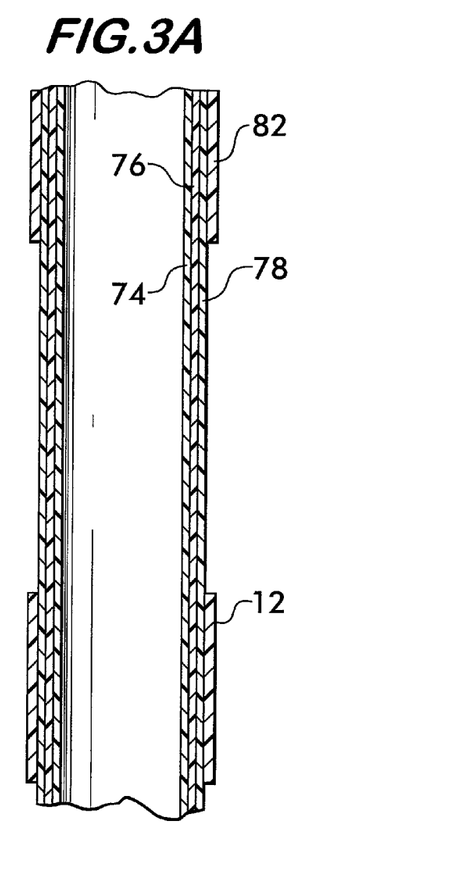

The varying thickness resin layer 82 will be formed on the parison 12 for as long as the valve 42 is open and pressure is maintained in the duct 30. The length of layer 82 along parison 12 will be determined by the speed of travel of the parison through the flow head and the duration of the valve opening. The speed at which the valve opens and closes will substantially determine the rate of change of the thickness of resin layer 82. The rate at which the thickness of the resin layer 82 varies with distance along the parison length can be further affected by the rate at which the piston 60 is moved. As shown in FIG. 3, as the piston 60 is forced slowly toward the duct it will result in a gradual increase in the thickness of the layer 82. As the piston is withdrawn slowly from the duct, it will result in a gradual decrease in the thickness of the layer 82. Faster piston movement results in more frequent variation of the layer's thickness with parison length. To produce an intermittent layer as shown in FIG. 3A, flow through the melt pipe 26 to the port 24 can be started and terminated abruptly by opening the valve 42 and moving the piston rapidly toward the duct, and then abruptly closing the valve 42 and rapidly withdrawing the piston 60 away from the duct. This will rapidly increase and lower the pressure within the melt pipe 60 and form an intermittent layer whose thickness very abruptly goes to zero when the pressure within the duct 30 is decreased with sufficient rapidity.

The operation of the valve 42 and the piston 60 can be synchronized using the controller 64 so as to position a precise length of the resin layer 82 at precise intervals along the parison 12 to position the layer 82 so that the molds 14 capture the parison with the layer 82 in the same position relative to each mold. This synchronization ensures that containers formed from the parison 12 are consistent with one another.

Figure 2A:
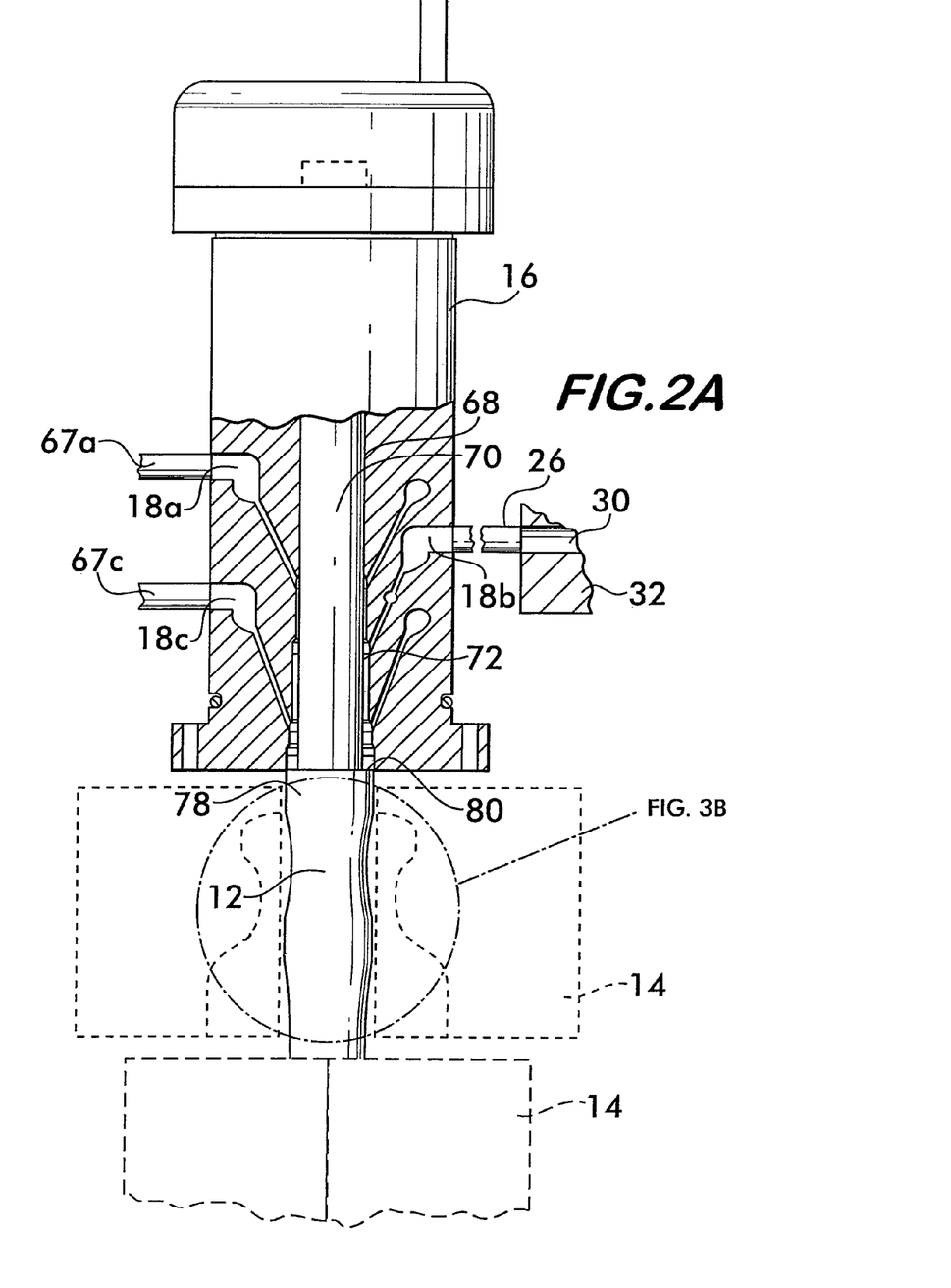
FIG. 2A is a sectional view of an alternate embodiment of the apparatus shown in FIG. 1, on an enlarged scale.
Figure 3B:
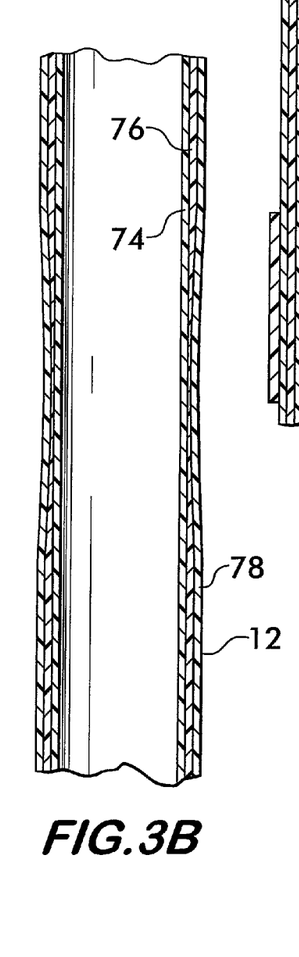

By connecting melt pipe 26 to the downstream port 24, the layer 82 becomes the outermost layer of the parison and forms the outermost layer of the containers produced from the parison. This configuration is useful, for example, for decorative aspects of the container design, as it allows containers to be made wherein the color changes along the length of the container. Furthermore, multiple apparatuses 10 may be used to precisely control the application of multiple intermittent layers through different ports on the flow head. Although the exemplary configuration has the resin layer 82 of varying thickness as the outermost layer, it is also feasible to produce parisons wherein an inner or an intermediate layer has varying thickness depending upon the relative position of the flow head port to which the melt pipe 26 is connected. An example of such a parison is shown in FIG. 3B, wherein intermediate layer 76 varies in thickness as a function of length along the parison 12. This parison is produced by the apparatus as configured in FIG. 2A, wherein the melt pipe 26 connects the duct 30 of valve block 32 to port 18b. Such a configuration is useful, for example, for applying an adhesive resin layer 76, or an intermediate layer comprising relatively expensive material, wherein the thickness variability permits greater control over production costs.

Various polymer resins such as polyolefins and polycarbonates may be used with the apparatus according to the invention to produce containers having multiple layers with different characteristics such as color, ultimate strength, thickness, chemical and barrier properties. Additionally, the apparatus and method according to the invention may be used to control the placement of barrier or adhesive layers as an inner, intermediate or outer layer of the parison. The control afforded by the invention will result in significant cost savings, as it allows fine control of the volume of the relatively expensive component layers of the container.

By using an apparatus according to the invention to apply an intermittent layer to a parison, it is possible to increase the production rate of containers having an intermittent layer as high as 180 per minute, a significant increase over the rate of 37 per minute possible with prior art devices.

What is claimed is:

1. An apparatus connectable in fluid communication with a flow head fed molten polymer resin by at least a first extruder to continuously produce a parison in said flow head and flowing away therefrom, said apparatus comprising:
   a valve block having a duct therethrough with an inlet and an outlet, said outlet being connectable in fluid communication with said flow head;
   a second extruder in fluid communication with said inlet, said second extruder continuously supplying molten polymer resin to said duct;
   a valve positioned within said duct and controlling flow of said molten polymer resin directly from said second extruder to said flow head; a controller for opening and closing the valve to vary the thickness of the molten polymer resin by controlling the rate at which the resin continuously flows through the duct;
   an accumulator cylinder in fluid communication with said duct at a position between said valve and said outlet and having a piston reciprocably movable within said cylinder, wherein actuating said piston varies the thickness of the molten polymer resin by reducing and increasing the resin pressure; and,
   a continuously extruded parison having a plurality of polymer resin layers and at least one polymer resin layer having variable thickness along the length of the parison.

2. An apparatus according to claim 1, further comprising a first melt pipe connecting said outlet to said flow head; and a second melt pipe connecting said second extruder to said inlet.

3. An apparatus according to claim 1, further comprising: a valve actuator mounted on said valve block, said valve actuator being operatively associated with said valve for opening and closing thereof.

4. An apparatus according to claim 3, wherein said valve actuator is a hydraulic actuator.

5. An apparatus according to claim 1, further comprising a piston actuator operatively associated with said piston for effecting reciprocal motion thereof.

6. An apparatus according to claim 5, wherein said piston actuator is a hydraulic actuator.

7. An apparatus according to claim 1, wherein said valve comprises a valve closing member movable reciprocably within said valve block transversely through said duct, said valve closing member having a first portion with an aperture therethrough and a second portion sealingly blocking said duct, said valve being open when said closing member first portion is moved into alignment with said duct, said valve being closed when said second portion is moved into alignment with said duct.

8. An apparatus for continuously producing a parison having a plurality of polymer resin layers, said apparatus comprising:
   a flow head;
   a plurality of first extruders in fluid communication with a plurality of first ports on said flow head, each of said first extruders continuously supplying a molten polymer resin for the inner layers of the parison;
   a valve block having a duct therethrough, said duct having an inlet and an outlet;
   a second extruder continuously supplying a second molten polymer resin;
   an extruder melt pipe connected between said second extruder and said inlet for conducting said second molten polymer resin to said duct;
   a valve positioned within said duct, wherein opening and closing said valve controls the rate of flow of said second molten polymer resin from said second extruder through said duct to said flow head;
   a valve actuator operatively associated with said valve for opening and closing thereof;
   an accumulator cylinder in fluid communication with said duct at a position between said valve and said outlet and having a piston reciprocably movable within said cylinder, wherein actuating said piston reduces or increases resin pressure within said duct; and,
   a flow head melt pipe connected between said outlet and a second port on said flow head positioned downstream of the plurality of first ports for conducting said second molten polymer resin to said flow head, wherein said second molten polymer resin comprises the outermost layer of the parison and said outermost layer has variable thickness along the length of said parison, and wherein the variable thickness is produced by a controller for opening and closing the valve and actuating the piston during continuous resin flow through the duct.

9. An apparatus according to claim 8, further comprising a piston actuator operatively associated with said piston for effecting reciprocal motion thereof.

10. An apparatus according to claim 9, wherein said actuators are hydraulic actuators.

11. An apparatus according to claim 8, wherein said valve comprises a valve closing member movable reciprocably within said valve block transversely through said duct, said valve closing member having a first portion with an aperture therethrough and a second portion sealingly blocking said duct, said valve being open when said closing member first portion is moved into alignment with said duct, said valve being closed when said second portion is moved into alignment with said duct.

12. An apparatus according to claim 9, wherein the controller is operatively associated with said actuators and said extruders, said controller controlling the operation of said extruders, the opening and closing of said valve and the motion of said valve piston for supplying said molten resin to said flow head.

13. An apparatus according to claim 8, wherein said flow head comprises: a central conduit; a mandrel positioned within said central conduit; said plurality of first ports in fluid communication with said central conduit, each of said first ports being in fluid communication with one of said first extruders, each of said first ports permitting molten resin from one of said first extruders to enter said central conduit and form said inner layers of said parison; and said second port in fluid communication with said central conduit, said second port being in fluid communication with said flow head melt pipe and permitting said second molten resin from said second extruder to enter said central conduit and form said outermost layer of said parison.

14. An apparatus according to claim 8, further comprising: a plurality of molds, each of said molds comprising first and second mold portions positionable on opposite sides of said parison, said mold portions being closable with one another to capture a portion of said parison within a mold space defined by said mold portions.

15. An apparatus according to claim 14, wherein the mold space defines a container, and wherein the apparatus is capable of producing 180 containers having an intermittent layer per minute.

* * * * *